No. 763,194. PATENTED JUNE 21, 1904.
J. MEES.
GRAIN LIFTER FOR HEADERS.
APPLICATION FILED SEPT. 2, 1903.
NO MODEL. 2 SHEETS—SHEET 1.
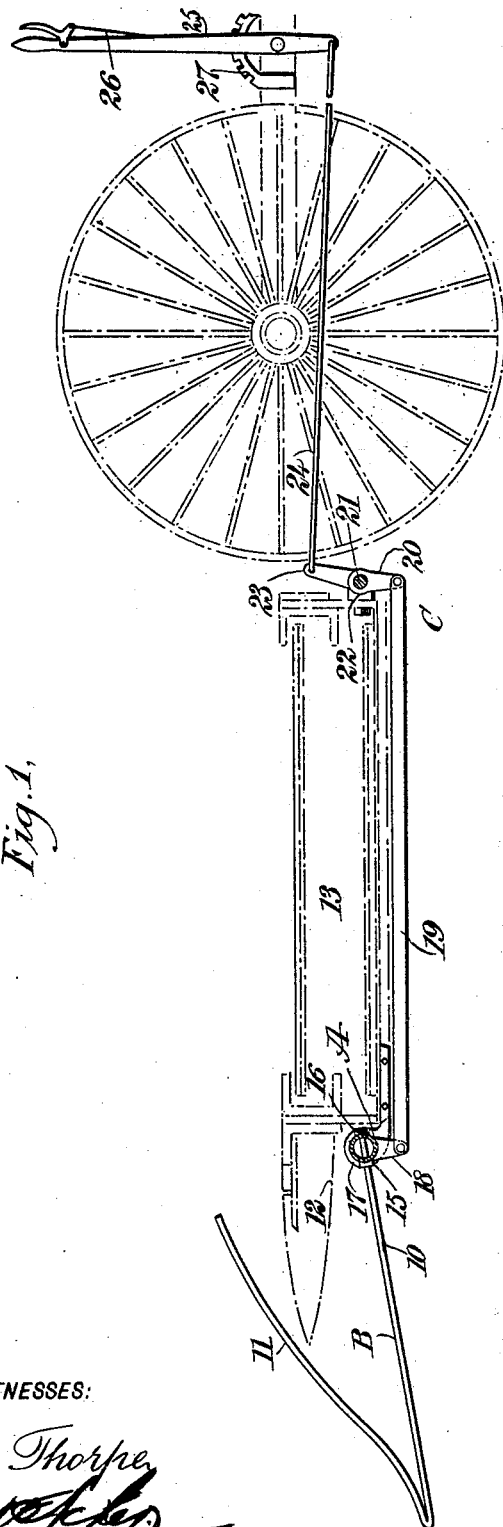
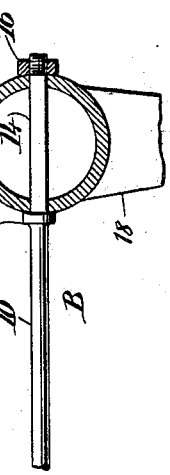
WITNESSES:
Edward Thorpe
INVENTOR
Jacob Mees
BY
ATTORNEYS

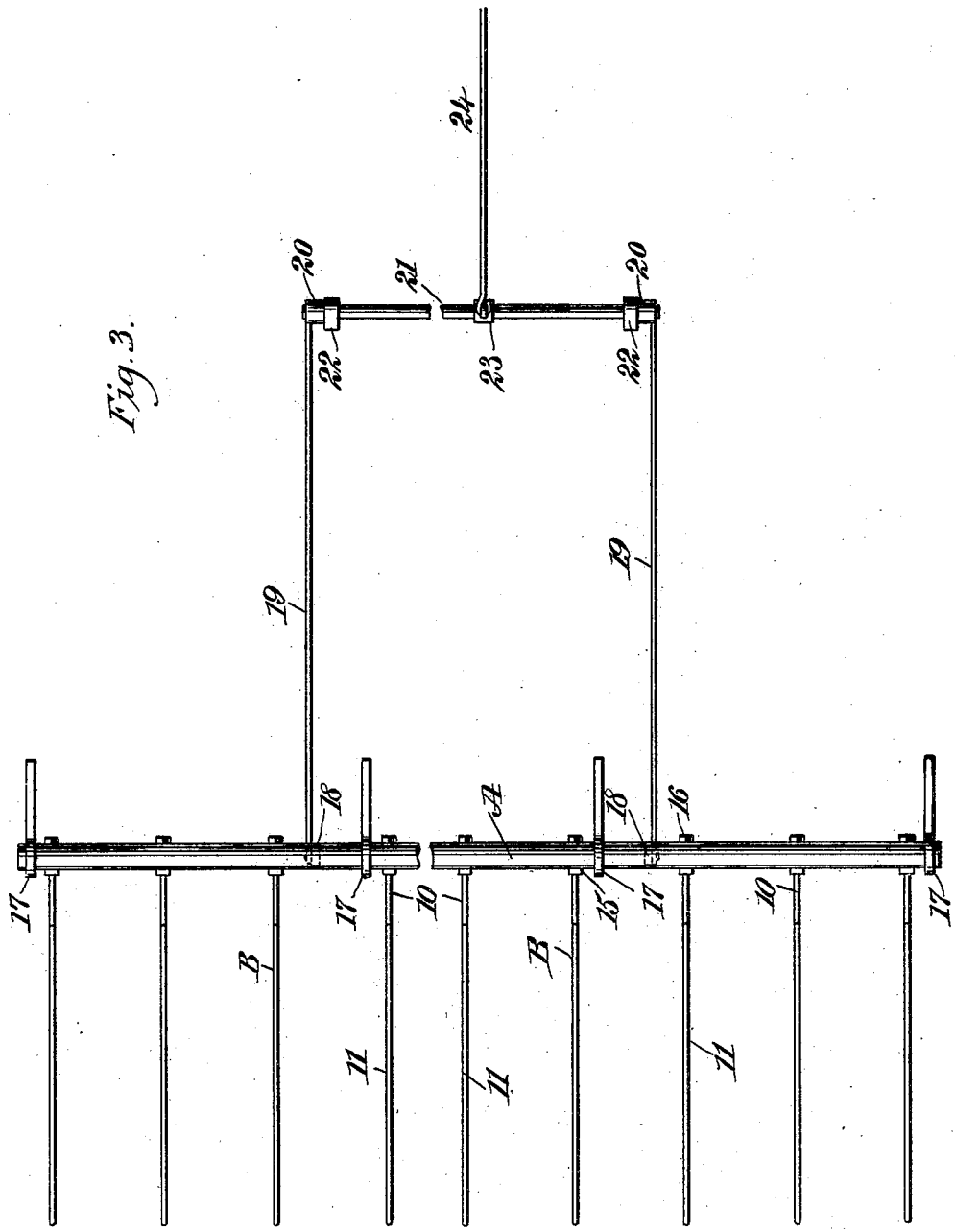

No. 763,194. Patented June 21, 1904.

UNITED STATES PATENT OFFICE.

JACOB MEES, OF ALPENA, SOUTH DAKOTA.

GRAIN-LIFTER FOR HEADERS.

SPECIFICATION forming part of Letters Patent No. 763,194, dated June 21, 1904.

Application filed September 2, 1903. Serial No. 171,637. (No model.)

*To all whom it may concern:*

Be it known that I, JACOB MEES, a citizen of the United States, and a resident of Alpena, in the county of Jerauld and State of South Dakota, have invented a new and Improved Grain-Lifter for Headers, of which the following is a full, clear, and exact description.

The purpose of the invention is to provide a simple, durable, and economic form of device for lifting the heads of grain, and adapted for removable attachment to any header or like machine, which device is especially designed for straightening individual stalks, so that the heads need not be lost in cutting, the device not being intended for use upon grain lying flat upon the ground, but particularly for use in connection with grain upon which the header can be readily worked or grain in which the heads have sagged down from any cause, so as to be below the level of the platform of the machine when the platform is at its lowest point.

A further purpose of the invention is to adjustably apply the head-lifting arms or fingers to the front of the platform of the machine below the guard-fingers and to carry all operating parts rearward beneath the platform, so that when attached to the machine the device will in no manner interfere with the proper operation of the machine.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a longitudinal section through the improved grain-head-lifting device, illustrating its application to a header, which latter is diagrammatically shown by dotted lines. Fig. 2 is an enlarged transverse section through the bar carrying the lifting arms or fingers, showing a portion of one of the lifting arms or fingers and the manner in which the fingers are secured to the bar; and Fig. 3 is a plan view of the device.

The body of the device consists of a bar A, preferably tubular, as is shown in Figs. 1 and 2, and a series of lifting arms or fingers B, carried by the bar A and located at desired intervals apart along the length of the bar. These fingers or arms B extend forward from the body-bar A, and each lifting finger or arm B consists of a lower member 10 and an upper member 11, both members being preferably made from one piece of spring-steel of suitable gage. The lower member 10 of each lifting arm or finger B is straight, and the upper member 11 of each lifting arm or finger extends rearwardly from the forward end of the lower straight member 10, being gradually curved upward from the lower member. The space between the upper portions of the upper and lower members of the lifting arms or fingers B is such that the guard-fingers 12 from the platform 13 of the header C may readily enter said space between the upper and lower members of the lifting arms or fingers.

Both the upper and lower members of the lifting arms or fingers B are preferably circular in cross-section, except at the rear end of the lower members 10, which rear end portions 14 of the said lower members 10 of the lifting arms or fingers are made polygonal or rectangular in cross-section, as is shown in Fig. 2. These rear portions 14 of the said lifting arms or fingers are passed through correspondingly-shaped apertures in the body-bar A, so as to prevent the lifting fingers or arms from turning in the body-bar. Each lower member 10 of a lifting arm or finger B is provided with a collar 15 at its rear circular end for engagement with the forward outer face of the bodybar A, and the rear extremity of the lower member 10 of each finger or arm B is threaded to receive a nut 16. These nuts engage with the outer rear face of the said body-bar A, as is shown in Fig. 1.

Suitable hangers 17 in any desired number are provided for the body-bar A, the bodybar being free to turn in the hangers 17, and between the ends of the body-bar downwardly-extending crank-arms 18 are located, preferably one at each side of the center of the bodybar. The forward ends of connecting-rods 19